Jan. 2, 1962 R. F. HERRMAN 3,015,773
POWER LINE NOISE CANCELLATION
Filed June 27, 1957

INVENTOR.
ROBERT F. HERRMAN
BY
ATTORNEY

United States Patent Office 3,015,773
Patented Jan. 2, 1962

3,015,773
POWER LINE NOISE CANCELLATION
Robert F. Herrman, Rochester, N.Y., assignor to General Dynamics Corporation, Rochester, N.Y., a corporation of Delaware
Filed June 27, 1957, Ser. No. 668,358
5 Claims. (Cl. 323—75)

This invention relates to noise cancellation in voltage sensitive bridge circuits and, particularly, is directed to the elimination of undesired noise voltages from the desired signal voltage detected across a diagonal of a balanced bridge.

Four-sided bridge circuits have many advantages in comparing voltages and in measuring differences of voltages across different branches of the bridge. One balanced bridge, which is chosen for illustration purposes only and is not intended to limit the generality of this invention, comprises a strain gage in which two adjacent branches of the bridge constitute the resistors of two strain-sensitive resistance coatings on a flexible blade. Flexure of the blade by the force to be measured causes differential variation of the two resistances and electrical unbalance of the bridge. Usually, a voltage is carefully regulated and is applied across one diagonal, and the read-out voltage is taken from across the other diagonal. In some applications, it is necessary to ground one read-out terminal, and "float" the regulated voltage supply across the other diagonal. Unfortunately, where the voltage difference to be read out is minute in amplitude and where the regulated voltage terminals exhibit an unbalanced-to-ground noise component, the minimum read-out voltage is seriously limited by the noise. In one bridge circuit a noise voltage of .5 millivolt was measured, consisting apparently of numerous harmonics of the power supply frequency and of Schott effects. This noise voltage was a significant percentage of the available read-out voltage which was 3.0 millivolts in this case.

The object of this invention is to provide an improved voltage sensitive bridge.

Another object of this invention is to provide an improved voltage sensitive bridge in which undesired or noise voltages are cancelled in the bridge and thus eliminated from the read-out voltage.

The objects of this invention are attained by connecting a regulated direct current voltage across one diagonal of a four-sided bridge and connecting the output circuit to one apex of the other diagonal with a voltage bucking circuit connected to the other apex of said other diagonal, said voltage bucking circuit being coupled into said output circuit to neutralize in the output circuit the undesired voltages appearing at the direct current source.

Other objects and features of this invention will become apparent to those skilled in the art by referring to the specific embodiments described in the following specification and shown in the accompanying drawing in which.

Figure 1:
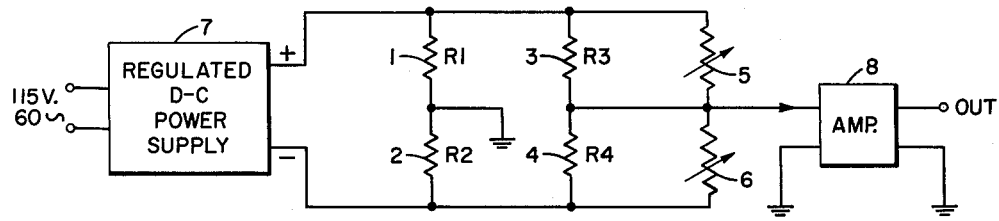
FIGURE 1 is a circuit diagram of the known bridge circuit.
Figure 2:
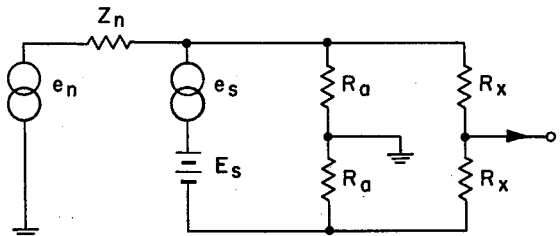
FIGURE 2 is a simplified circuit equivalent to the circuit of FIGURE 1.
Figure 3:
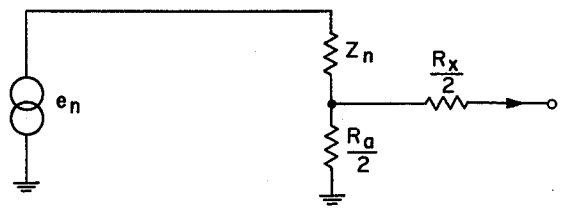
Figure 4:
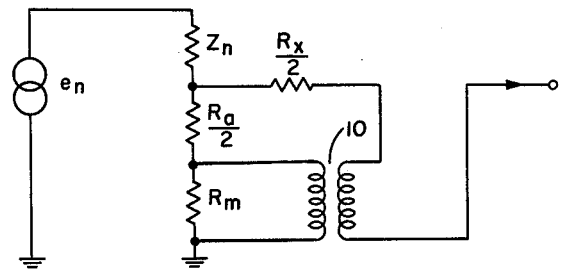
Figure 5:
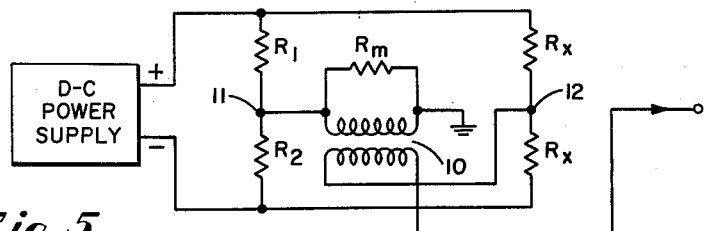

FIGURE 3 is a circuit diagram of the circuit of FIGURE 2, still further simplified, FIGURE 4 is a simplified equivalent circuit diagram of one embodiment of the bridge of this invention, and FIGURE 5 is a circuit diagram of the preferred embodiment of this invention, The known bridge circuit of FIGURE 1 comprises resistances 1, 2, 3 and 4, connected as usual in the four sides of the bridge circuit with one apex referred to ground. In this example, resistances 3 and 4 comprise the two differentially variable resistances of a strain gage. One increasing in value while the other decreases in value as the blade, not shown, on which the resistances are coated is flexed. Resistances 3 and 4 are preferably equal in value, although not necessarily, and are calibrated by the parallel resistances 5 and 6. Across one diagonal of the bridge is applied a regulated direct-current voltage from the power source 7. Unbalance of the bridge is read out from across the other diagonal by the amplifier 8.

Because of technical requirements it may be necessary to use strain gages in which the average peak force encountered changes the resistance ratio, R3/R4, by as little as only .02%, resulting in a 3 millivolts D.C. output when 30 volts D.C. is applied across the bridge from source 7. In order to provide an output referred to ground, it is necessary to "float" the D.C. excitation source and ground the junction point of resistors R1 and R2, as shown in FIGURE 1.

In FIGURE 2 is shown the circuit equivalent of the bridge of FIGURE 1 in which the regulated D.C. voltage source 7 is called $E_s$ in series with the voltage source $e_s$ representing the unfiltered voltage variation of the principal source. The variable resistors are represented by $R_x$, and the complementary bridge resistors R1 and R2 by $R_a$. For a given value of strain-gage deflection, the output voltage is proportional to $E_s + e_s$. Where the power supply voltage is well regulated and the peak value of $e_s$ is as low as .1% of $E_s$, the peak variation of 3 millivolt D.C. in the power supply results in only 3 microvolts in the bridge. If the bridge is balanced, $e_s$ will be nulled as well as $E_s$. Therefore, the observed constant noise signal must be accounted for by noise voltage, $e_n$, coupled to the direct current output terminals through impedance $Z_n$. $e_n$ is believed to be a combination of rectifier ripple and many external power line noises, while $Z_n$ is primarily a combination of stray capacitances between the output terminals and the power supply transformer windings.

Since the effective source impedance of the power supply is very low, the equivalent circuit thereof may be further simplified as shown in FIGURE 3, as far as $e_n$ is concerned. It now becomes apparent that the noise voltage present at the bridge output is $$\frac{R_a/2}{R_a/2 + Z_n} \cdot e_n$$

regardless of the amount of bridge unbalance within the operating range. In one power source it was found that the peak voltage of $e_n$ was about 5 volts, measured at either output terminal with an open circuit to ground and that $Z_n$ was about 1.5 megohms, $R_a$ and $R_x$ being each 300 ohms. The peak voltage at the bridge output, due to $e_n$, was thus found to be $$\frac{150}{150 + 1,500,000} \times 5$$

or about 0.5 millivolt. As previously mentioned, .5 millivolt contributes a serious error in measuring a 3.0 millivolt signal. The input impedance of amplifier 8 is many times greater than 150 ohms, and its loading effect may thus be neglected in the equivalent circuits of FIGURES 2 and 3.

$R_a$ cannot be reduced significantly without overloading the power supply. The A.C. impedance of $R_a/2$ could be reduced by shunting each resistance $R_a$ with a large capacitance, but this remedy is impractical since thousands of microfarads would be required at conventional power line frequencies. To increase $Z_n$ significantly would require bulky, expensive insulation and shielding of the power supply and would also require isolation of the primary from the power line by an unwieldy isolation transformer having low capacitance between the secondary and primary and ground.

According to an important and characteristic feature of this invention, the means of eliminating the noise voltage $e_n$ from the output is to pick off a proportionate amount of the $e_n$ voltage and add it in opposition to the bridge output voltage containing $e_n$. By equating these two voltages, the noise signal can be cancelled completely from the output of the bridge.

As shown in FIGURE 5, the resistor $R_m$ is added to the bridge diagonal to pick off the cancelling signal. Amplification and direct current isolation of this signal is accomplished by the transformer 10 having a flat response over the range of frequencies contained in the noise voltage $e_n$. That is, the output circuit taken between 11, the junction of resistances 1 and 2, and ground, contains the primary of the transformer winding; the secondary winding of the transformer being connected in series with the output junction 12 and so polarized as to combine the two components of $e_n$ in phase opposition.

A simplified equivalent circuit of FIGURE 5 is shown in FIGURE 4. Assuming that the transformer has an input impedance that is much greater than $R_m$ at the fundamental noise frequency, the signal in the bridge output, due to $e_n$, now becomes:

$$\left[\frac{R_a/2+R_m}{R_a/2+R_m+Z_n} \cdot e_n\right] - \left[\frac{nR_m}{R_a/2+R_m+Z_n} \cdot e_n\right]$$

where $n$ is the secondary-to-primary turns ratio of the transformer. This signal becomes zero when $$R_a/2 + R_m = nR_m$$

This equality can also be expressed as $R_a/R_m = 2(n-1)$. Obviously, $n$ must be greater than unity for a real solution.

One transformer which may be effectively employed in the circuits of FIGURES 4 and 5 may comprise any good quality audio interstage coupling transformer having a high ratio of mutual inductance to primary leakage inductance, and having a mutual impedance which is large compared to the primary resistance, and which must be much greater than $R_m$. Such a transformer should also have a well-shielded core, minimizing the voltage induced in the secondary by ambient A.C. magnetic fields.

Observations show that the fundamental frequency of the noise at the amplifier input can easily be reduced by a factor of 20, with greater reductions of the higher harmonics.

Many modifications may be made in the bridge circuit of this invention without departing from the scope of the invention as defined in the appended claims.

What is claimed is:

1. In combination with a balanced four-sided bridge circuit, a regulated direct-current voltage source connected across one diagonal of said bridge; an output circuit connected to one apex of the other diagonal, a voltage bucking circuit connected to the other apex of said other diagonal, said voltage bucking circuit comprising a resistor connected between said other apex and reference ground and being coupled into said output circuit to neutralize in the output circuit undesired voltages appearing across said other diagonal.

2. In combination in a balanced four-sided bridge circuit, a regulated power supply connected across one diagonal of the bridge, said source having an effective noise voltage source, $e_n$, in series with an impedance, $Z_n$; an output terminal connected to one apex of the other diagonal, the two adjacent branches of the bridge connected to the opposite apex of resistances $R_a$ being connected in parallel to ground through an output resistance, $R_m$; means for subtracting a predetermined amount of the noise voltage from across $R_m$ from the output voltage appearing at said output terminal.

3. In combination in a strain gage, a bridge, two adjacent branches of said bridge comprising differentially variable resistances, $R_x$; complementary branches of the bridge comprising corresponding resistances, R1 and R2; a load impedance, $R_m$, being connected between the junction of R1 and R2 and ground; an output circuit connected to the junction of resistances $R_x$, and a voltage source for energizing said bridge, said voltage source being coupled between the junctions, respectively, of resistances R1 and R2, and the complementary resistances $R_x$, said output circuit being coupled to said load impedance, $R_m$, to neutralize the components of noise voltage appearing in said output circuit.

4. In combination in a strain gage bridge circuit, two resistances $R_x$, respectively, in adjacent branches of the bridge, and known resistances R1 and R2 in the remaining two branches, a direct-current voltage source connected across one diagonal, a transformer, one apex of the other diagonal being connected to ground through the primary of said transformer, a resistor of a value of the order of said known resistances connected across said primary, the other apex of said other diagonal being connected to the output circuit through the secondary winding of said transformer, the voltage gain of said transformer and the value of said resistor being adjusted to substantially equal and oppose the voltage at said other apex.

5. A differential bridge circuit comprising four impedances; a power source containing undesired noise voltages, connected across one diagonal of the bridge; one apex of the other diagonal being coupled to a reference ground, a resistor for sampling the voltage of the current in the mentioned apex-to-ground coupling; an output circuit connected to the other apex of said other diagonal, and means for subtracting the sampled voltage across said resistor from the voltage of said output circuit.

References Cited in the file of this patent

UNITED STATES PATENTS

| | | |
|---|---|---|
| 1,490,031 | Schmidt | Apr. 8, 1924 |
| 1,808,589 | Amsden | June 2, 1931 |
| 1,875,961 | Suchtelen | Aug. 23, 1932 |
| 2,045,474 | Kemler | June 23, 1936 |
| 2,393,669 | Wheaton et al. | Jan. 29, 1946 |
| 2,514,935 | Clapp | July 11, 1950 |
| 2,812,489 | Halpern | Nov. 5, 1957 |